United States Patent
Sherman et al.

(10) Patent No.: US 9,489,853 B2
(45) Date of Patent: Nov. 8, 2016

(54) READING AND INFORMATION ENHANCEMENT SYSTEM AND METHOD

(75) Inventors: Kenneth Nathaniel Sherman, Santa Barbara, CA (US); Andrew Hyungwoo Choi, Atlanta, GA (US); Andrew Michael Livingston, Palo Alto, CA (US)

(73) Assignee: Kenneth Nathaniel Sherman, Santa Barbara, CA (US)

( * ) Notice: Subject to any disclaimer, the term of this patent is extended or adjusted under 35 U.S.C. 154(b) by 874 days.

(21) Appl. No.: 12/972,065

(22) Filed: Dec. 17, 2010

(65) Prior Publication Data

US 2011/0087956 A1 Apr. 14, 2011

Related U.S. Application Data

(63) Continuation-in-part of application No. 12/284,706, filed on Sep. 24, 2008, which is a continuation-in-part of application No. 10/951,313, filed on Sep. 27, 2004, now abandoned.

(51) Int. Cl.
*G06F 17/00* (2006.01)
*G09B 5/00* (2006.01)
(Continued)

(52) U.S. Cl.
CPC .............. *G09B 5/00* (2013.01); *G06F 17/241* (2013.01); *G06F 17/2735* (2013.01); *G06F 17/30613* (2013.01); *G06F 17/30619* (2013.01); *G06F 17/30631* (2013.01); *G06F 17/2235* (2013.01); *G06F 17/277* (2013.01)

(58) Field of Classification Search
CPC ........... G06F 17/2235; G06F 17/2735; G06F 17/2247; G06F 17/241; G06F 17/2795; G06F 17/277; G06F 17/2765; G06F 17/30613; G06F 17/30619; G06F 17/30631; G09B 5/00

USPC .......................... 715/254–255, 259; 345/204
See application file for complete search history.

(56) References Cited

U.S. PATENT DOCUMENTS 4,544,360 A 10/1985 Goodman
6,128,635 A * 10/2000 Ikeno .......................... 715/246
(Continued)

OTHER PUBLICATIONS

Ed H. Chi et al., "eBooks with Indexes that Reorganize Conceptually", Chi 2004, Apr. 24-29, 2004,Vienna, Austria, ACM 1-58113-703-6/04/0004.*

(Continued)

*Primary Examiner* — Chau Nguyen
(74) *Attorney, Agent, or Firm* — Aka Chan LLP

(57) ABSTRACT

A written document (hereinafter referred to as a "work," on electronic format which includes, stories, novels, education texts, biographies, compilations, collections, anthologies, tracts, and any other traditional format for relatively extensive texts) provides access to reference, bibliography and/or definition material through an electronic software capability associated with the work. Depending upon reader access information or characteristics (e.g., age, grade, proficiency, or position within the work or any other identifiable reader characteristic or access limitation), any request for reference material, definitions, explanations, translations, or other material provided in the associated software capability is automatically limited by system acknowledgement of the reader access information or characteristics. As the reader's access information or characteristics change, the quality and/or quantity and/or format of requested information with respect to a work changes.

21 Claims, 1 Drawing Sheet

| |
|---|
| CREATE OF COPY PRIMARY WORK |
| DETERMINE CONTENT ACCESSIBLE TO OR REQUIRING DEFINITION |
| DETERMINING CONTENT APPROPRIATE TO USER CHARACTERISTICS AS PRIMARY WORK PROGRESSES |
| PROVIDING DEFINITIONS APPROPRIATE TO USER CHARACTERISTICS AT DIFFERENT STAGES OF PRIMARY WORK (E.G., CHAPTERS, SECTIONS, USER STATUS) |
| PROVIDING ACCESS TO DEFINITIONS INCLUDING REFERENCE TO POSITION WITHIN PRIMARY WORK |
| ALTERING PROVIDED DEFINITIONS UPON USER REQUEST BASED UPON CHANGES IN USER PRIMARY WORK POSITION OR CHANGE IN USER CHARACTERISTICS |
| OPTIONALLY PROVIDING ON-LINE USER ACCESS TO ALTER DEFINITIONS |
| ADMINISTRATIVE REVIEW OF PROPOSED ALTERED PROGRESSIVE DEFINITIONS |
| REFUSAL OR ACCEPTANCE OF PROPOSED ALTERED PROGRESSIVE DEFINITIONS |

(51) Int. Cl.
    *G06F 17/30*           (2006.01)
    *G06F 17/24*           (2006.01)
    *G06F 17/22*           (2006.01)
    *G06F 17/27*           (2006.01)

(56) References Cited

U.S. PATENT DOCUMENTS

| | | | |
|---|---|---|---|
| 6,366,908 | B1 | 4/2002 | Chong et al. |
| 6,400,996 | B1 | 6/2002 | Hoffberg et al. |
| 6,407,757 | B1 | 6/2002 | Ho |
| 6,551,109 | B1 | 4/2003 | Rudmik |
| 6,633,742 | B1 | 10/2003 | Turner et al. |
| 6,728,681 | B2 | 4/2004 | Whitham |
| 6,732,090 | B2 | 5/2004 | Shanahan et al. |
| 6,766,311 | B1 | 7/2004 | Wall et al. |
| 7,849,393 | B1* | 12/2010 | Hendricks et al. ........... 715/203 |
| 2005/0278378 | A1* | 12/2005 | Frank ........................ 707/104.1 |
| 2006/0075345 | A1 | 4/2006 | Sherman |
| 2007/0083828 | A1* | 4/2007 | Toriyama ............. G06F 3/0233 715/816 |
| 2007/0204211 | A1* | 8/2007 | Paxson ...................... 715/501.1 |
| 2008/0005151 | A1* | 1/2008 | Iwakura ....................... 707/102 |
| 2008/0059488 | A1* | 3/2008 | Iyengar et al. ............... 707/100 |
| 2008/0140397 | A1* | 6/2008 | Millman .............. G09B 17/006 704/235 |
| 2008/0208833 | A1* | 8/2008 | Basmov ............ G06F 17/30427 |
| 2011/0261030 | A1* | 10/2011 | Bullock ........................ 345/204 |

OTHER PUBLICATIONS http://developer.apple.com/library/mac/documentation/Cocoa/Conceptual/CocoaFundamentals/CocoaDesignPatterns/CocoaDesignPatterns.html#//apple_ref/doc/uid/TP40002974-CH6-SW16.

PCT Notification of Transmittal of the ISR and Written Opinion of the ISA for related PCT patent application PCT/US05/34125.

* cited by examiner

| |
|---|
| CREATE OF COPY PRIMARY WORK |
| DETERMINE CONTENT ACCESSIBLE TO OR REQUIRING DEFINITION |
| DETERMINING CONTENT APPROPRIATE TO USER CHARACTERISTICS AS PRIMARY WORK PROGRESSES |
| PROVIDING DEFINITIONS APPROPRIATE TO USER CHARACTERISTICS AT DIFFERENT STAGES OF PRIMARY WORK (E.G., CHAPTERS, SECTIONS, USER STATUS) |
| PROVIDING ACCESS TO DEFINITIONS INCLUDING REFERENCE TO POSITION WITHIN PRIMARY WORK |
| ALTERING PROVIDED DEFINITIONS UPON USER REQUEST BASED UPON CHANGES IN USER PRIMARY WORK POSITION OR CHANGE IN USER CHARACTERISTICS |
| OPTIONALLY PROVIDING ON-LINE USER ACCESS TO ALTER DEFINITIONS |
| ADMINISTRATIVE REVIEW OF PROPOSED ALTERED PROGRESSIVE DEFINITIONS |
| REFUSAL OR ACCEPTANCE OF PROPOSED ALTERED PROGRESSIVE DEFINITIONS |

READING AND INFORMATION ENHANCEMENT SYSTEM AND METHOD

RELATED APPLICATION DATA

This application is a Continuation-in-Part of U.S. patent application Ser. No. 12/284,706, filed Sep. 24, 2008, which is in turn a continuation-in-part of U.S. patent application Ser. No. 10/951,313, filed Sep. 27, 2004 now abandoned.

BACKGROUND OF THE INVENTION

1. Field of the Invention

The present invention relates to the field of media, such as text, video, graphics, and sound, containing terms, ideas, images, and information for which background references, footnotes, translations or definitions may be desirable to the reader.

2. Background of the Art

When individuals use primary text such as written, video, film, graphic, or sound recording matter (which includes hard copy material and electronic material), there may be a need or desire to provide reference material to a reader, upon request, to enable the reader to appreciate or understand the text, graphics, or sound. In a learning or scholastic environment, it may also be necessary to limit access to reference or definition material, or, at least, to limit the degree to which terms can, or should be, explained to specific readers depending on their particular, and distinguishable, levels of progress. These levels of progress, for example, may be defined by the reader's age, grade level, program level (e.g., Advanced Placement versus Basic study tracks), stage of study within an ongoing course (e.g., first semester versus second semester), the user's place in the sequence of the (written, video, graphic, or sound recording) material, and the like. At the present time, when a reader requests reference material or definition from within material (a text, sound recording, video game or video), a uniform reference or uniform (single) definition for the requested term is provided. This system has limited informational and educational options both for the providers and users of written, graphic, video, videogames, and sound recordings.

SUMMARY OF THE INVENTION

Media is combined with associated user reference material the content of which varies according to reader characteristics. Reader characteristics include specified educational level, skill level, place in the progress of the media, age, and so on. Media can be in the form of text, images, or sound. Media can be a written document, such as a story, tract, novel, text book, biography, compilation, collection, or anthology. It can be a score of a musical composition or a recording of music. It can be a written play or an audio or video or film recorded play. It can be a data base, a series of images such as in a picture book, movie, or video, or it can be a series of sounds, such as recording of bird sounds or a spoken word recording. Each of these forms is hereinafter referred to as a "work." A work can be available in electronic format which provides easy access to reference, bibliography and/or definition material through an electronic software capability associated with the work. Depending upon reader access information or characteristics, (e.g., age, grade, proficiency, position within the work or any other identifiable reader characteristic or access limitation) any request for reference material, definitions, explanations, translations, footnotes, or other material available from the associated software is automatically limited by system acknowledgement of specific reader access information or reader characteristics. As the reader's access information or characteristics change, the quality and/or quantity and/or format of information supplied to the reader with respect to the work changes.

BRIEF DESCRIPTION OF THE FIGURE

FIG. 1 shows a flow diagram of a system by which the presently described technology of a Progressive Reference system is prepared.

DETAILED DESCRIPTION OF THE INVENTION

A "Progressive Reference" system according to the presently described technology is a reference work classification scheme that contains citations or available information (e.g., definitions, background material, citations, foot notes, annotations, translations, cross-references, or other information, or sources of information, that might be useful to a reader) that differ for given requested terms or requested ideas depending on what stage of training, what level of authorized access has been granted, or where in the primary material (or Work) the reader is at when he or she looks up the term, phrase, name or idea. An ordinary reference work, such as a concordance or index, would provide a single, uniform, general definition to describe the idea as it occurs in the whole text or group of related texts.

The present technology may work for any type of information, source material and media and combinations thereof including but not limited to religious works such as the Bible, the Koran, the Talmud, more conventional texts such as trade books, trade manuals, repair or user manuals, novels, textbooks, histories, biographies, conventional movies, educational tracts, text books, interactive movies, interactive videos, DVD'S, CD-ROM's, CDs, internet applets and content, overhead projector and computer displays, audio and video tapes, hard-disk drives, solid-state memories, magazines, book overlays, plays, poems, videogames, computer games, musical scores, computer code, databases, DNA sequences, web pages, interactive web pages, web pages from application service providers, and so on. Furthermore, the invention is applicable to all forms and types of reference schemes such as, but not limited to, encyclopedias, concordances, glossaries, dictionaries, thesauruses, taxonomies, ontologies, indexes, maps, graphics, and so on.

Unlike previous referencing schemes, a Progressive Reference depends on one or more user characteristics. A user characteristic can be supplied by the user, such as the user's age, gender, and/or educational level. A user characteristic can be supplied automatically such as the user's position in the source material (or primary work), and/or the time and date of the inquiry, or automatically from user associated data in a data base, or by a supervisor. A user characteristic can be supplied manually, semi-automatically or automatically. A user can supply information that directs the limitation to specific historical time periods, cultures, academic disciplines, and so on, limited only by the nature of citations that have been edited into the Progressive Reference data base for the particular work at the time the inquiry is made.

The Progressive Reference, thus, depends on a known or identified, reader characteristic, or set of characteristics, to select an allotted scope or type of information that it provides to the user. A Progressive Reference requires that each occurrence of a definition, citation, or "entry" for each term is available on an "updated" basis or changed in correspondence to each reader, for each place the certain term appears, and/or each time the inquiry is made—except in those instances where nothing new and important has happened with respect to that term since it last occurred in the work, and except where no change is expected in the need for more detailed or different explanations of that term since it was last encountered in the source material or since the last request. Certain terms may not need to have a Progressive Reference capability as the degree of need for expanded definition, or any definition, may not have to change over the course of use of the primary work. However, the advantages of the Progressive Reference for some terms in a primary work do change and are provided as a function of the Progressive Reference. Normally, information in a Progressive Reference entry will be limited to what is found in the source material, or work, between the start of the source material and where the user is in the source material when the user requests a definition. Entries may add information from outside of the work, itself, that becomes relevant and useful, particularly at a point of progression in the source material, but entries should, normally, not contain any information, either from the source material or from outside sources, that should be revealed only later. Unlike standard entries, a Progressive Reference entry would not give away the plot before the denouement, although at the conclusion of the primary work, detailed explanations, identification of clues, and explanations of foreshadowings may be provided.

In a Progressive Reference Glossary for the "Harry Potter" series, for example, a reader on page 72 of Harry Potter and the Chamber of Secrets, J. K. Rowling's second volume in the series, will look up the word, "potions" and indicate (or will be so automatically identified in an electronic text) that he or she is on Vol II, page 72. In a standard Harry Potter encyclopedia, a researcher would indicate only the word, "Potions" and would find examples of many, perhaps all, of the potions taught at Hogwarts or those used by wizards, in generals, in all of the published Harry Potter books. In a Progressive Reference, only those potions that have already been mentioned in Volume 1, Harry Potter and the Sorcerer's Stone, and those already mentioned in the first 72 pages of Volume 2, Harry Potter and the Chamber of Secrets, will be displayed—consistent with Ms. Rowling's assumption that the reader knows, and remembers, all of what has been revealed up to Page 72 and nothing beyond that.

Using the present technology of a Progressive Reference, a reader of an e-book would have only to tap on the word she wanted to learn more about. The entry for that specific word at that specific location on the page would be called up by the system and appear on the reader's screen. Similarly, in a movie, interactive movie, TV show, interactive TV show, or videogame, a keystroke, a word spoken by the user, or other user signal would call up the entry appropriate to where the user saw the entry, or the idea suggesting the entry, in the source material. The entry could contain information appropriate to the medium such as previous scenes from the source material and/or scenes from other TV shows, videogames, news events, sporting events or movies. The entry could contain URLs and links to web sites. Information from outside sources could include definitions, pronunciation, and etymology of terms, germane historical antecedents, and cultural allusions. Information provided may provide hints that the author would approve, but should not reveal information that will spoil the suspense or add an unnecessary burden to the reader. In an educational environment, where student access to information may be controlled by a teacher or school, enabling passwords or a central control of degree of access may be overseen by the educational institute. For example, in a language study program, when a student asks for a translation of a word with multiple meanings, the Progressive Reference would provide different definitions for students dependent upon their level in the course, which would be identified in the e-based system. For example, a student in a 101 course would receive a far more specific (and more useful) definition for a specific term or phrase than would someone in a graduate level course translating texts from a specific time period, where a term may have or have had a different meaning.

At the other extreme of technology, the Progressive Reference could be in the form of a book, or in the form of a back section of the source material work. The page numbers of such Progressive Reference would correspond (as well as practical) to the page numbers of the source material work. On each page of the Progressive Reference itself, a list of defined terms in the order they appear on the page in source material work, or, alternatively, in alphabetical order, would be presented with the definitions appropriate to that page or even to the place on the page.

Even in book form, entries could comprise photos, art works, graphics, charts, and other forms of expression suitable to print. If it took more than one page in the Progressive Reference to display all of the entries belonging to a page in the source material, the following page number would be found under the same page number as in the source material work followed by the letter, "a." If two pages were required, the second page would be the same page number as in the source material followed by the letter, "b." And, so on.

The preparer of the Progressive Reference determines which terms are to be defined and prepares the entries coded by the page number, scene number, or other indicia of place or progress where the term appears. Similarly, the preparer would have to prepare as many entries as practical to encompass all of the reader/user characteristics anticipated in the reader/user population.

Correspondingly, and in order for the user to look up the entry, the user must supply the point in the source material beyond which the user does not wish information. This is usually where the reader or viewer is at in the source material at the moment he or she is requesting the information. Further examples of places in the source material where a user would encounter a term about which he or she would want further information include a page number, a place in the development of a musical score, a scene in a movie, a level or point of play in a video game, an instruction in a computer program, or a paragraph in a text book. In the case of a video game, characters, clues, scenes, locations, weapons, and charms are normally revealed in sequence and only under certain conditions. In this case, the information in an entry would depend not only on the sequence of play, but also on what the player had accomplished and, possibly, other reader characteristics such as the player's age.

Just as the preparer has to anticipate, and provide for reader characteristics, the user has to supply pertinent information about him/herself in order for the system to point to the appropriate citation in the Progressive Reference. In the case of a text book, particularly, a student might want only the textbook information presented to a certain point in the text because more information would be confusing or because the student would want to be required to learn only what is needed for an upcoming test. Even, in this example, a student might supply personal information that adjusts the limitation just mentioned to add information that he/she would be assumed to know based on the student's academic level, course of study, and so on.

An electronic progressive reference can have means for the user to recall previous terms that the user referenced along with their respective citations for review at a later date and for comparing the different citations as they changed over time. In addition, an electronic progressive reference can store such look-ups for a teacher or administrator as a tool for gauging the frequency with which different terms were referenced by different types of users.

EXAMPLE

For purposes of the remainder of this description, the term, Source Text is the Primary Work (such as a novel, videogame, movie, textbook, computer program, music, or other kind of database) on which the Progressive Reference is based. A Key Entry is a word or group of words representing a person, place, thing, idea or action from the Source Text; this is the term that the user looks up. An Entry is the complete citation, or answer to the user's query, which includes the Key Entry and its description. The inventor believes that these are the common terms used in the art of compiling reference books.

Although this invention will be found to be useful for analyzing all sorts of databases, the example used here is a mystery novel. As a user reads the novel, she frequently encounters a character or a thing which she is supposed to remember from earlier in the novel. It is an aspect of this technology that when she looks up the character or thing, she can learn what has already been revealed in the unfolding plot without learning so much about the subject that the plot will be given away or the suspense spoiled.

In writing or editing a Progressive Reference, the judgment of the writer and editor (the "Preparer") is even more crucial than for a standard glossary or concordance because the writer will attempt to include clues and significant facts that are both worthy of recall and important at that moment in the story—without inadvertently or gratuitously giving away the plot. In some Progressive References, supporting non-source material information of a historical, mythological and etymological nature may be included in the Entry. But, to stay true to the intention of the invention, the Preparer will not include information that, preferably, should appear in the Entry for the same term when it appears later in the source material.

Examples of supporting information that may be contained in a Progressive Reference include standard dictionary definitions, translations such as British English to American English; pronunciation guides and audio samples; graphics such as photos, drawings, and art reproductions; videos; music; references to other sources; and URLs. Again, all of this supporting material, in the judgment of the Preparer, must not confuse the reader or anticipate later events inadvertently by including data prematurely.

A Preparer can take advantage of standard word processing and video editing applications by preparing an index or a set of tags for words, ideas, actions, code sequences, photos, or scenes of interest.

These tags can be used on two ways. One way is to copy the last Entry along with new source material relevant to the term (or Key Entry) that appears since the last Entry. In this case, the Preparer makes the new Entry by editing the last Entry and incorporating ideas or text from the new source material. A second way takes more time but can avoid the mistake of missing a prior occurrence of a term that is not reflected in the last Entry but has now, at this point in the source material, become more relevant. This second way presents to the Preparer not only the last Entry and the new relevant material, but also all of the instances where the Entry or underlying subject matter has, so far, occurred in the source material. Either way, the Preparer should also revise earlier Entries when it becomes apparent that overlooked source material is now important. (Specially designed GUIs can make these Tags available, by means of dedicated look-up tables, to users who wish to follow the sequence of specific actions, ideas, concepts, people or things in the Source Text.

The invention requires that Entries be prepared, in advance, (either manually or by automatic or semi-automatic software designed to compile encyclopedic entries as is known in the art) and stored in the system, preferably in a look-up table as follows:

TABLE US-00001

Look-up Table ("KE" = Key Entry)

| Column 1 | Column 2 | Column 3 | Column 4 |
|---|---|---|---|
| KE Row 1 | Pg # | Entry | |
| KE Row 2 | Pg # | Entry | |
| KE Row 3 | Pg # | Entry | |
| KE Row 4 | Pg # | Entry | |

Columns 2-4 may contain more place information such as volume #, revision #, paragraph #, line #, bar # (music), scene #, etc. One available technology for identifying place information within the text is using the concept of a "Range Number," (This is an X-Code convention) A range number is used to identify each key entry in the behavior system. A range number is one plus the number of times a word has occurred since the beginning of the work. The software quickly runs through the whole text counting the number of times each word is used. If the Key Entry is the 7th time a specific word occurs, the preparer (or his software) puts in Range Number 7. If the same Progressive Reference applies to a series of range numbers, (say 7, 8 & 9) because nothing significant has changed, the code looks like this: "Range Number 7-9."

Note that, unlike conventional concordance entries, an Entry has to be prepared and stored in the look-up table for each page number, or place, where, in the judgment of the Preparer, significant new information for that Key Entry appears in the Source Text.

A Progressive Reference can assume the form of any other reference work such as a book, as in the example provided below. Or, it can be a computer program, a web site, or a computer-aided device. Examples of such computer-aided devices include a computer game, a PDA, an e-book, or a smart-phone. In the case of a computer program or computerized device, the Preparer will have access to an interactive Graphical User Interface (GUI) that allows the Preparer manually, or automatically, to enter the page number, scene, time, place, or other indicia of where in the sequence of the Source Text the Preparer is. The GUI may be visual, tactile, or aural.

Some GUI's, where applicable, will have means for the preparer to enter more precise information than the page number. This can include the "Range" (identifies the specific location of each key entry in X-Code), volume #, the version or revision number, the paragraph number, and the line number. GUI's will have means to display the resulting Entry. Some GUI's will be able automatically to store and retrieve place information that changes only occasionally such as the volume number, and/or version number.

Some highlighted or keyed terms can receive such inputs automatically. For example, a computer, PDA or e-reader will contain a digital version of the Source Text or source data. Thus, Key Entries can be requested by the reader placing the cursor on the word the reader wants to look-up, (the Key Entry)—automatically referencing a term along with its place in the Source Text.

Another method of accessing entries is to display for the reader a separate list of terms (Key Entries) for each page of text or source data. Thus, as a page of Source Text is displayed, a corresponding table of Key Entries specific to that page is displayed or conveniently accessible.

Entries can be assembled for each page by type or genre. For example, a film clip, a definition, an example, a picture, a translation, a synonym, music, a musical score, a voice recording, computer or other type of notation, etc.

Flow Charts

A flow chart for the System includes two sections, shown below. The first flow chart shows a system for convenient retrieval of the Entry by the reader. The second describes how an Entry can be prepared by a Preparer and placed in the Look-Up Table, manually or automatically.

Flow Chart #1

Retrieval of an Entry

1. Key Entry and Place information (see column 2 above) are entered into the reader's GUI, either manually by the reader or automatically.

2. The GUI instructs the software to go to the Look-Up Table.

3. For each Key Entry, the software looks in column 1 of Table 1 for the Key Entry and puts the corresponding rows into memory location 1.

4. Then, the software looks in column 2 of the Look-Up Table for a match on the entered Place information and puts the matching row number(s) into memory location 2.

5. The software then compares the contents of memory location 1 and 2 and selects the row number which appears in both memory locations.

6. The software then goes to the Look-Up table and copies the column 3 ENTRY for the selected row to the GUI.

7. The GUI can also be sent to other look-up tables to display, where available, additional stored information pertaining to the Reference Item, possibly by page number.

8. If no match is found, the following possibilities are explored:
  a. Common misspellings are searched using a "Misspellings look-up table." When a misspelling is found, the system starts again using the Key Entry found in the "Misspelling table."
  b. The first time a Key Entry is used in the Source Text and if no extraneous information is included by the preparer, the following is displayed at the Entry: "This is the first use of the term."
  c. If the term does not appear on the cited page, the following is displayed at the Entry: "This term is not used on this page; the last time the term was used was on Page X" (with a subroutine to add the correct page number for the last use). For speed of retrieval, certain systems will construct a look-up table for each page that is constructed "on-the-fly" by the GUI each time a page is turned or manually entered. This will allow the GUI to search very small, page-specific, look-up tables that can be stored in small memories. Similarly, the user can use other small Reference Item look-up tables stored in RAM.

Flow Chart #2

Preparation of an Entry

In one embodiment of the presently described technology, using a novel as the example, the preparer, goes through two or three stages:

Stage 1 (or Stage 1a and 1b):
  The look-up table contains three columns. Column 1 is the Key Entry. Column 2 is the page number or place in the Source Text where the Key Entry occurs. Column 3 is the Entry.
  The Preparer starts on page 1 and continues forward. In Column 2, the Preparer enters the numeral representing the page number. In column 1, the Preparer enters a Key Entry, on each successive row, for each term the Preparer wants to explain on that page. Each Entry comprises a citation containing information that is revealed on that page alone. The Preparer may add relevant information available from outside sources such as the definition, the pronunciation, the etymology, germane historical antecedents, and cultural allusions, but nothing from a future page in the text. In Stage 1, once a Key Entry has been selected, it always generates an Entry wherever it recurs in the text. (If the Preparer feels that a subsequent Key Entry adds no new information of importance, the Preparer can indicate something like, "no new information." Thus, in the final editing that takes place in Stage 3, the Entry for said subsequent Key Entry will be unchanged from the previous time that Key Entry appeared. On each page of the source text, the Preparer will be looking for new Key Entries to add.
Still in stage 1, when a Key Entry reappears, the Preparer creates its new Entry by copying the Key Entry's last Entry and adding new information. As was the case in preparing each previous Entry, the Preparer may supply new extra information as appropriate. At the end of Stage 1, every Entry in the Progressive Reference will comprise information from the specific place it appears (along with extra information specifically appropriate at each point in the text) concatenated to each of the previous Entries for that Key Entry.
Another approach for an individual Preparer, and one that may be preferred when there are multiple Preparers, is to break up Stage 1 into two stages. In this case, Stage 1a is the preparation of every Entry individually. Then, in Stage 1b, the Entries are sequentially concatenated.
The use of multiple Preparers is advantageous and possibly novel and non-obvious in the following method: Using the internet, multiple participants are invited to prepare individual Entries. If there were thousands of participants, it would be possible for the organizer to receive all of the Entries for an entire text in a few days. The organizer would then assign the editing task described in Stage 2 to individuals responsible for specific Key Entries. The Harry Potter example, shown below, shows three stages.

Stage 2:

Stage 2 is an editing function. The objective of Stage 2 is to edit each Entry to retain only that which remains important from the new Entry for a Key Entry combined with its previous Entry.

Flow Chart Steps for Preparation of Progressive Reference

Step 1: Create a look-up table with as many "place" columns as necessary plus five additional columns. There should be an unlimited number of rows. In this example, there are two "place columns, one for the Volume's name and number, and one for the page number." It may also be desirable to have a column for the line number or section of the page.

Step 2: Label the columns as follows:

TABLE-US-00002

| Column 1 | Column 2 | Column 3 | Column 4 | Column 5 | Column 6 | Column 7 |
|---|---|---|---|---|---|---|
| Row # | Source Text & Vol. # | Page # | Key Entry | Entry for this Page (for Stage 1a) | Complete Entry (for Stage 1b) | Edited Entry (for Stage 2) |

Step 3: Label the first row: Column Number
Step 4: Label the second row: Column Labels
Step 5: Number the following rows successively
Example of a Progressive Reference Preparation Table

TABLE-US-00003

| Column 1 | Column 2 | Column 3 | Column 4 | Column 5 | Column 6 | Column 7 |
|---|---|---|---|---|---|---|
| 1 | Harry Potter and the Philosopher's Stone | Page # | Key Entry | Entry for this Page (for Stage 1a) | Complete Entry (for Stage 1b) | Edited Entry (for Stage 2) |
| 2 | | 1 | first Key Entry on page 1 | Entry | Entry for first Key Entry | Edited Entry |
| 3 | | 1 | second Key Entry on page 1 | Entry | Entry for second Key Entry | Edited Entry |
| 4 | | 1 | third Key Entry on page 1 | Entry | Entry for third Key Entry | Edited Entry |
| 3 | | 2 | first Key Entry on page 2 | Entry, including matching Entry concatenations from previous page | Entry for first Key Entry on page 2 | Edited Entry, including removing any redundancies |
| 4 | | 2 | second Key Entry on page 2 | Entry, including matching Entry concatenations from previous page | Entry for second Key Entry on page 2 | Edited Entry, including removing any redundancies |
| 5 | | etc. | etc. | etc. | etc. | etc. |

Step 6: Write the Source Text Title, Volume and Version No. (if applicable) in Row 1, Column 2.

Step 7: Create the first Key Entry by writing the first page number of the Source Text in Row 2, Column 3.

Step 8: Write the first Key Entry you have chosen in Row 2, Column 4.

Step 9: In the same row, in Column 6 create the Entry for the Key Entry that you entered in Row 2, Col 4.

Step 10: For each Key Entry you choose to enter into the table from this first page of the Source Text, repeat steps 7 through 9. At the end of Step 10, you should have created and entered all of the Key Entries and their respective Entries from the first page of the text.

Step 11: Write the second page number of the Source Text in Col. 3 of the next empty TOW.

Step 12: In the row you selected in Step 11, create the first Key Entry from Page 2 of the Source Text, and write it in Column 4.

Step 13: In the same row, create the Entry in Col. 5 for the Key Entry you entered in Step 12.

Step 14: For each Key Entry you entered from the second page of the Source Text, repeat steps 12 and 13. At the end of Step 14, you should have entered all of the Key Entries with their respective Entries from the second page of the text.

The following Stage 1b and Stage 2 steps will allow you to create an edited final Entry in Column 7:

Step 15: Read each row in column 4 looking for a Key Entry to be repeated. Once a repeat occurs, it will represent an instance where a Key Entry in the Row that contains a 1 in col. 3 matches a Key Entry in the row that contains a 2 in col. 3.

Step 16: Manually or automatically, and into column 6 in the row of the second Key Entry of the match, copy, so as to concatenate, the contents of column 5 in the row of the first Key Entry of the match and the contents of column 5 in the row of the second Key Entry of the match.

Step 17: In Stage 2, rewrite the contents of column 6 into column 7 by removing redundancies and unimportant detail. Try to create a clear and concise final Entry. In some instances, particularly in a manual system, the Preparer may choose to create an edited Entry in column 7 by going directly to Stage 2 (step 17), at the end of each page. In this case, the Preparer will concatenate the most recent column 7 Entry with the new column 5 Entry to make a new column 6 Entry.

Alternatively, the Preparer may repeat steps 15 and 16 for each successive page leaving step 17 until all of the Entries for the whole Source Text have been created. In this case, column 6 Entries will swell as each accumulates its string of all of the previous Entries for each instance of the same Key Entry. Nonetheless, this long-winded method has the advantage of preserving very previous Entry in its entirety for a final edit. By performing step 17 only once, at the end, it may be less likely that the Preparer will prematurely edit out an important detail from an earlier entry. Furthermore, as discussed above, it is the most efficient method of incorporating Entries prepared by many authors. This one edit method may necessitate a final review of the entire progressive reference before publication to make certain that Entries do not miss an important detail from earlier in the Source Text.

A reminder that, in Step 17, the Preparer has the opportunity, once again to add non-Source Text material to each final edited Entry such as a dictionary definition, but it is the object of the invention not to reveal information from following pages. Preferably, the information provided by an Entry may provide hints, but does not unduly reveal information that will spoil the suspense or add an unnecessary burden for the reader.

This invention also includes means for automating the Progressive Reference preparation process using a computer program that uses queries to take the Preparer through the steps described above. Starting on page one, the program would read the source text. The Preparer's GUI would allow the Preparer to identify those words in the text that the program should copy into column 4 as a new Key Entry. Each time a Key Entry reappeared in the text, the program would copy it into column 4. When so entering a Key Entry, the GUI would also indicate the place information in the appropriate columns. The program would also copy into column 6 all previous Entries.

In addition to presenting the Source Text as a convenient way for the GUI to identify existing Key Entries and for the preparer to identify new Key Entries in column 5, the GUI would prompt the Preparer to create Key Entries other than words taken directly from the Source Text. Examples of such GUI prompts could include, "Any major ideas or themes on this page?" It could provide a check list of previous Key Entries in certain categories organized by the Preparer. And, it could prompt for Entries of other types, such as film clips and GUIs, or for Entries of external information such as histories, allusions and translations.

Example of Preparation of a Progressive Reference

Here is an example of a Progressive Reference for the first seven pages of Harry Potter. Key Entries are in Italics:

Step 1: Information is entered from the page itself and, when and if appropriate, from outside sources:

Volume 1, Harry Potter and the Sorcerer's Stone
Progressive Reference
After Completing Step 1a
Page 1
Step 1a
Chapter 1
The Boy Who Lived
Mr. and Mrs. Dursley
The Dursleys live at number four Privet Drive. Privet is a type of hedge that makes for landscaping that creates the appearance of tidiness and order. In French, it means private or hidden.
The Dursleys are "perfectly normal," and don't "hold with . . . anything strange or mysterious.
The Dursleys have everything they want.
But, they have a secret, and,
Their greatest fear is that someone will discover their secret.
Mr. Dursley
The director of a firm called Grunnings which makes drills
Big and beefy with a short neck and large mustache.
Mrs. Dursley
Thin and blonde with a long neck
Spies on neighbors
Dudley Dursley
Small son doted on by his parents
Page 2
Step 1a
The Potters
Mrs. Potter is Mrs. Dursley's sister.
Mrs. Potter and Mrs. Dursley haven't met for several years.
Mrs. Dursley pretends she doesn't have a sister.
Mrs. Dursley thinks that Mr. Potter is a "good-for-nothing."
The Potters' Small Son
The Dursley's have never seen him and they don't want their son mixing with "a child like that."
Dudley Dursley
Having a tantrum; the Dursleys love him anyway.
Strange Things
Will soon be happening all over the country
It's Tuesday
A cloudy sky
Large Tawny Owl
Tawny is a color; a light brown to brownish orange
Flutters past the Dursley's window.
Mr. Dursley
Dotes on his son even when he is having a tantrum
Thinks he sees a cat reading a map, dismisses it as impossible
A Tabby Cat
A tabby cat is a cat with a gray or tawny coat mottled with black. It is sometimes called simply a tabby.
Is sitting on the corner consulting a map
A Map
Is being read by a tabby cat on the corner in front of the Dursley's house
Page 3
Step 1a
Mr. Dursley
Disbelieves his first notion that he saw a cat on the corner consulting a map and, later, reading a street sign
Hoping to get a large order of drills
Is driving to town and arrives at his office after seeing people dressed in cloaks
Always sits with his back to the window in his office on the 9th floor
Cat
Reads the sign that says Privet Drive
Map
Disappears
People in Cloaks
Encountered by Mr. Dursley, on his way to work, on the edge of town, while in the usual traffic jam
Cloaks
A cloak is a loose outer garment, such as a cape.
A cloak can conceal what is inside.
Worn by people milling about the edge of town on Tuesday morning
Traffic Jam
Mr. Dursley usually finds himself in a traffic jam on the way to work
Emerald-green Cloak
Worn by a man who is older than Mr. Dursley. He is seen by Mr. Dursley milling about on Tuesday morning whit other strangely dressed people.
"Green gives stability, endurance and quietude. People with the luminous green of Saturn in their aura are the harmonizers and pacifiers of the world. They stand for social stability." © S.F.Heart.com)

Owls
Seen swooping about in broad daylight, past Mr. Dursley's window, above gaping onlookers.
Owls usually fly silently and at night so are seldom seen by people outside of zoos.
Page 4
Step 1a
Mr. Dursley
Likes to yell at people
Eats buns (donuts)
Hears on Tuesday morning, the strangely dressed people talking excitedly about the Potters
Harry Potter
Is the son of the Potters
Page 5
Step 1a
Tiny Old Man in Violet Cloak
With a squeaky voice (What is the significance of a tiny man with a squeaky voice?)
Is bumped into by Mr. Dursley on Tuesday morning outside Mr. Dursley's office
Is rejoicing
"Violet is the seventh and last color of the spectrum. It represents the seventh and highest quality a person attains-noble spiritual aspiration. Therefore it has always been connected to the priestly ceremonies. Purple and violet speak of honor, spirituality and self-esteem." © S.F.Heart.com)
Mr. Dursley
Outside Mr. Dursley's office on Tuesday morning, Mr. Dursley bumps into a tiny old man in a violet cloak who speaks to him rejoicing in what has happened.
Doesn't approve of imagination
Returning from work on Tuesday morning, sees the same tabby cat sitting on wall; loudly shoos cat.
You-Know-Who
Reputed to be gone at last
Muggles
People like Mr. Dursley
Tabby Cat
Sitting on wall, at the end of the workday on Tuesday, when Mr. Dursley returns home
Has markings around its eyes
Page 6
Step 1a
Tabby Cat
When shooed, doesn't move; gives stern look to Mr. Dursley
Owls
Hundreds are sighted around the nation on Tuesday
Shooting Stars
There is a "downpour" of them on Tuesday
Predicted Rain
Doesn't happen on Tuesday
Page 7
Step 1a
Mr. and Mrs. Dursley
On Tuesday evening, discuss the Potters and the strange goings on in town.
Harry Potter
Is Dudley's age
Dudley
Is Harry's age
Tabby Cat
Is still there, Tuesday night looking expectedly down Privet Drive "as though it were waiting for someone."

Step 1b: The preparer copies, for each Entry, all of the information from the previous Entry for the same Key Entry. If this were to be done automatically, the software would copy and paste the previous Entry in front of, or before, the Entry being prepared.
Here is the result of Step 1b for the first seven pages:
Volume 1, Harry Potter and the Sorcerer's Stone
Progressive Concordance
After completing Step 1b
Page 1
Step 1b
Chapter 1
The Boy Who Lived
Mr. and Mrs. Dursley
The Dursleys live at number four Privet Drive. Privet is a type of hedge that makes for landscaping that creates the appearance of tidiness and order. In French, it means private or hidden.
"Perfectly normal," and don't "hold with . . . anything strange or mysterious
Have everything they want
Have a secret
Their greatest fear is that someone will discover their secret
Mr. Dursley
The director of a firm called Grunnings which makes drills
Big and beefy with a short neck and large mustache.
Mrs. Dursley
Thin and blonde with a long neck
Spies on neighbors
Dudley Dursley
Small son doted on by his parents
Page 2
Step 1b
The Potters
Mrs. Potter is Mrs. Dursley's sister.
Mrs. Potter and Mrs. Dursley haven't met for several years.
Mrs. Dursley pretends she doesn't have a sister.
Mrs. Dursley thinks that Mr. Potter is a "good-far-nothing."
The Potters' Small Son
The Dursley's have never seen him and they don't want their son mixing with "a child like that."
Dudley Dursley
Small son doted on by his parents
Having a tantrum; the Dursleys love him anyway.
Strange Things
Will soon be happening all over the country
It's Tuesday
A cloudy sky
Large Tawny Owl
Tawny is a color; a light brown to brownish orange
Flutters past the Dursley's window.
Mr. Dursley
The director of a firm called Grunnings which makes drills
Big and beefy with a short neck and large mustache
Dotes on his son even when he is having a tantrum
Thinks he sees a cat reading a map, dismisses it as impossible
A Tabby Cat
A tabby cat is a cat with a gray or tawny coat mottled with black. It is sometimes called simply a tabby.
Is sitting on the corner consulting a map
A Map
Is being read by a tabby cat on the corner in front of the Dursley's house Page 3
Step 1b
Mr. Dursley
The director of a firm called Grunnings which makes drills
Big and beefy with a short neck and large mustache
Dotes on his son even when he is having a tantrum
Disbelieves his notion that he saw a cat on the corner consulting a map and, later, reading a street sign
Hoping to get a large order of drills
Is driving to town and arrives at his office after seeing people dressed in cloaks
Always sits with his back to the window in his office on the 9th floor
A Tabby Cat
A tabby cat is a cat with a gray or tawny coat mottled with black. It is sometimes called simply a tabby.
Is sitting on the corner, in front of the Dursleys' house, consulting a map and reading the street sign that says Privet Drive
A Map
Is being read by a tabby cat on the corner in front of the Dursley's house
Disappears
People in Cloaks
Encountered by Mr. Dursley, on his way to work, on the edge of town, while in the usual traffic jam
Cloaks
Worn by people milling about the edge of town on Tuesday morning
A cloak is a loose outer garment, such as a cape.
A cloak can conceal what is inside
Traffic Jam
Mr. Dursley usually finds himself in a traffic jam on the way to work
Emerald-Green Cloak
Worn by a man who is older than Mr. Dursley. He is seen by Mr. Dursley milling about on Tuesday morning whit other strangely dressed people.
Owls
Seen swooping about in broad daylight, past Mr. Dursley's window, above gaping onlookers. This is unusual. Owls usually fly silently and at night so are seldom seen by people outside of zoos.
Page 4
Step 1b
Mr. Dursley
The director of a firm called Grunnings which makes drills
Big and beefy with a short neck and large mustache
Dotes on his son even when he is having a tantrum
Disbelieves his first notion that he saw a cat on the corner consulting a map and, later, reading a street sign
Hoping to get a large order of drills
Is driving to town and arrives at his office after seeing people dressed in cloaks
Always sits with his back to the window in his office on the 9th floor
Likes to yell at people
Eats buns (donuts)
On Tuesday morning, hears the strangely dressed people talking excitedly about the Potters
Harry Potter
Is the son of the Potters
The Dursley's have never seen him and they don't want their son, Dudley, mixing with "a child like that."

Page 5
Step 1b
Tiny Old Man in Violet Cloak
With a squeaky voice (What is the significance of a tiny man with a squeaky voice?)
Is bumped into by Mr. Dursley on Tuesday morning outside Mr. Dursley's office
Is rejoicing
Mr. Dursley
The director of a firm called Grunnings which makes drills
Big and beefy with a short neck and large mustache
Dotes on his son even when he is having a tantrum
Thinks he sees a cat reading a map, dismisses it as impossible
Disbelieves his first notion that he saw a cat on the corner consulting a map and, later, reading a street sign
Hoping to get a large order of drills
Is driving to town and arrives at office after seeing people dressed in cloaks
Always sits with his back to the window in his office on the 9th floor
Likes to yell at people
Eats buns (donuts)
Hears on Tuesday morning, the strangely dressed people talking excitedly about the Potters
Bumps into tiny old man in a violet cloak on Tuesday morning outside Mr. Dursley's office
Doesn't approve of imagination
Returning from work on Tuesday morning, sees the same tabby cat sitting on wall; loudly shoos cat.
You-Know-Who
Reputed to be gone at last
Muggles
People like Mr. Dursley
A Tabby Cat
A tabby cat is a cat with a gray or tawny coat mottled with black. It is sometimes called simply a Tabby.
Is sitting on the corner reading a map
Reads the sign that says Privet Drive
Sitting on wall, at the end of the workday, on Tuesday, when Mr. Dursley returns
Has markings around its eyes
Page 6
Step 1b
A Tabby Cat
A tabby cat is a cat with a gray or tawny coat mottled with black. It is sometimes called simply a tabby.
Is sitting on the corner consulting a map and reading the street sign that says Privet Drive
Sitting on wall, at the end of the workday, on Tuesday, when Mr. Dursley returns
Has markings around its eyes
When shooed, doesn't move; gives stern look to Mr. Dursley
Owls
Seen swooping about in broad daylight, past Mr. Dursley's window, above gaping onlookers. This is especially unusual because owls fly silently and at night so are seldom seen by people by people outside of zoos.
Hundreds are sighted around the nation on Tuesday
Shooting Stars
There is a "downpour" of them on Tuesday
Predicted Rain
Doesn't happen on Tuesday Page 7
Step 1b
Mr. and Mrs. Dursley
Live at number four Privet Drive
"Perfectly normal," and don't "hold with . . . anything strange or mysterious
Have everything they want
Have a secret
Their greatest fear is that someone will discover their secret
On Tuesday evening, discuss the Potters and the strange goings on in town.
Harry Potter
The Dursley's have never seen him and they don't want their son mixing with "a child like that."
Is Dudley's age
Dudley
Small son doted on by his parents
Having a tantrum; the Dursleys love him anyway.
Is Harry's age
A Tabby Cat
A tabby cat is a cat with a gray or tawny coat mottled with black. It is sometimes called simply a tabby.
Is sitting on the corner consulting a map and reading the street sign that says Privet Drive
Sitting on wall, at the end of the workday, on Tuesday, when Mr. Dursley returns
Has markings around its eyes
When shooed, doesn't move; gives stem look to Mr. Dursley
Is still there, Tuesday night looking expectedly down Privet Drive "as though it were waiting for someone."
Step 2: The preparer edits each Entry by removing what is redundant or now irrelevant. The preparer edits the Entry for brevity, comprehension and emphasis.

Here is the final version the Progressive Reference through Page 7
    Volume 1, Harry Potter and the Sorcerer's Stone
    Progressive Reference
    After Completing Steps 1a and 1b
    Page 1
    Step 2
    Chapter I
    The Boy Who Lived
    Mr. and Mrs. Dursley
    The Dursleys live at number four Privet Drive. Privet is a type of hedge that makes for landscaping that creates the appearance of tidiness and order. In French, it means private or hidden.
    The Dursleys are "perfectly normal," and don't "hold with . . . anything strange or mysterious.
    They have everything they want.
    They have a secret, and
    Their greatest fear is that someone will discover their secret.
    Mr. Dursley
    Is the director of a firm called Grunnings which makes drills.
    He is big and beefy with a short neck and large mustache.
    Mrs. Dursley
    Is thin and blonde with a long neck.
    She enjoys spying on her neighbors.
    Dudley Dursley
    Dudley is the Dursley's small son. He is doted on by his parents.

Page 2
Step 2
The Potters
Mrs. Potter is Mrs. Dursley's sister. The two have not met for several years. Mrs. Dursley pretends she doesn't have a sister and she thinks that her sister's husband Mr. Potter is a "good-far-nothing."
The Potters' Small Son
The Potters have a small son whom the Dursley's have never seen. They don't want their son mixing with "a child like that."
Dudley Dursley
The Dursleys have a small son whom they dote on even when he is having a tantrum
Strange Things
Will soon be happening all over the country
It's a cloudy Tuesday.
Large Tawny Owl
Tawny is a color; a light brown to brownish orange.
The large tawny owl flutters past the Dursley's window.
Mr. Dursley
Is the director of a firm called Grunnings which makes drills. He is big and beefy with a short neck and large mustache.
Mr. Dursley dotes on his small son even when he is having a tantrum.
Mr. Dursley thinks he sees a cat reading a map, dismisses it as impossible
A Tabby Cat
A tabby cat is a cat with a gray or tawny coat mottled with black. It is sometimes called, simply, a tabby.
Mr. Dursley sees one sitting on the corner consulting a map
A Map
Is being read by a tabby cat on the corner in front of the Dursleys' house.
Page 3
Step 2
Mr. Dursley
Mr. Dursley is the director of a firm called Grunnings which makes drills. He is big and beefy with a short neck and large mustache.
Mr. Dursley dotes on his small son even when he is having a tantrum.
Mr. Dursley disbelieves his notion that he saw a cat on the corner consulting a map and, later, reading a street sign.
Mr. Dursley is hoping to get a large order of drills.
On his way to the office, while waiting in the usual traffic jam, he sees people dressed in cloaks.
Mr. Dursley always sits with his back to the window in his office on the 9th floor.
A Tabby Cat
A tabby cat is a cat with a gray or tawny coat mottled with black. It is sometimes called, simply, a tabby.
A tabby is sitting on the corner in front of the Dursleys' house consulting a map and reading the street sign that says Privet Drive
A Map
Mr. Dursley sees a map being read by a tabby cat on the corner in front of his house.
When Mr. Dursley looks again, the map has disappeared.
People in Cloaks
Mr. Dursley sees people in cloaks on the edge of town, on his way to his office.

Cloaks

Cloaks are worn by the people whom Mr. Dursley sees milling about the edge of town on Tuesday morning.

A cloak is a loose outer garment, such as a cape.

A cloak can conceal what is inside

Traffic Jam

Mr. Dursley usually finds himself in a traffic jam on the way to work.

Emerald-Green Cloak

Mr. Dursley, on Tuesday morning sees a man, older than himself wearing an emerald green cloak. The man is milling about with other strangely dressed people. "Green gives stability, endurance and quietude. People with the luminous green of Saturn in their aura are the harmonizers and pacifiers of the world. They stand for social stability." © S.F.Heart.com) Emerald-Green may connote Irish.

Owls

Seen swooping about in broad daylight, past Mr. Dursley's window, above gaping onlookers. This is unusual. Owls usually fly silently and at night so are seldom seen by people outside of zoos.

Page 4

Step 2

Mr. Dursley

The director of a firm called Grunnings which makes drills. He is big and beefy with a short neck and large mustache.

Mr. Dursley dotes on his son even when he is having a tantrum.

Mr. Dursley disbelieves his first notion that he saw a cat on the corner consulting a map and, later, reading a street sign.

Mr. Dursley is hoping to get a large order of drills.

On his way to the office, while waiting in the usual traffic jam, Mr. Dursley sees people dressed in cloaks.

Mr. Dursley always sits with his back to the window in his office on the 9th floor Mr. Dursley likes to yell at people Mr. Dursley eats buns (donuts)

On Tuesday morning, Mr. Dursley hears the strangely dressed people talking excitedly about the Potters Harry Potter Harry is the son of the Potters. The Dursley's have never seen him. They do not want their son, Dudley, mixing with "a child like that."

Page 5

Step 2

Tiny Old Man in Violet Cloak

Outside Mr. Dursley's office, on Tuesday morning, Mr. Dursley bumps into (literally!) a tiny old man, in a violet cloak, with a squeaky voice.

The tiny old man in a violet cloak speaks to Mr. Dursley happily excusing him and rejoicing about what has happened.

What is the significance of a tiny man with a squeaky voice? What is the significance of the color violet? (There is a plant called magic violet.)

Mr. Dursley

The director of a firm called Grunnings which makes drills. He is big and beefy with a short neck and large mustache.

Mr. Dursley dotes on his son even when he is having a tantrum

Mr. Dursley disbelieves his first notion that he saw a cat on the corner consulting a map and, later, reading a street sign.

Mr. Dursley is hoping to get a large order of drills

On his way to the office, while waiting in the usual traffic jam, Mr. Dursley sees people dressed in cloaks.

Mr. Dursley always sits with his back to the window in his office on the 9th floor Mr. Dursley likes to yell at people Mr. Dursley eats buns (donuts)

On Tuesday morning, Mr. Dursley hears the strangely dressed people talking excitedly about the Potters.

Outside Mr. Dursley's office, on Tuesday morning, Mr. Dursley bumps into (literally!) a tiny old man, in a violet cloak, with a squeaky voice.

Mr. Dursley doesn't approve of imagination

Returning from work on Tuesday morning, Mr. Dursley sees the same tabby cat sitting on wall; loudly shoos cat.

You-Know-Who

Reputed to be gone at last

Muggles

People like Mr. Dursley

A Tabby Cat

A tabby cat is a cat with a gray or tawny coat mottled with black. It is sometimes called, simply, a tabby.

A tabby is sitting on the corner in front of the Dursleys' house consulting a map and reading the street sign that says Privet Drive The tabby is still sitting on a wall in front of the Dursley house, at the end of the workday, on Tuesday, when Mr. Dursley returns The tabby has markings around its eyes Page 6

Step 2

A Tabby Cat

A tabby cat is a cat with a gray or tawny coat mottled with black. It is sometimes called simply a tabby.

A tabby, with markings around its eyes, is sitting on the corner in front of the Dursleys' house when Mr. Dursley leaves the house on Tuesday morning. The tabby is consulting a map and reading the street sign that says Privet Drive. The tabby is still sitting on a wall in front of the Dursley house, at the end of the workday, on Tuesday, when Mr. Dursley returns. When shooed, the tabby doesn't move; instead it gives a stern look to Mr. Dursley.

Owls

Seen swooping about in broad daylight, past Mr. Dursley's window, above gaping onlookers. This is unusual. Owls usually fly silently and at night so are seldom seen by people by people outside of zoos.

Hundreds are sighted around the nation on Tuesday

Shooting Stars

There is a "downpour" of them on Tuesday

Predicted Rain

Doesn't happen on Tuesday

Page 7

Step 2

Mr. and Mrs. Dursley

The Dursleys live at number four Privet Drive. Privet is a type of hedge that makes for landscaping that creates the appearance of tidiness and order. In French, it means private or hidden.

The Dursleys are "perfectly normal." They don't "hold with . . . anything strange or mysterious.

They have everything they want.

They have a secret, and

Their greatest fear is that someone will discover their secret.

On Tuesday evening, the Dursleys discuss the Potters and the strange goings on in town.

Harry Potter

Harry is the son of the Potters. The Dursleys have never seen him. He is the Dursley's son, Dudley's age. The Dursleys do not want Dudley, mixing with "a child like that."

Dudley

Dudley the son of the Dursleys is Harry's age. He is doted on by his parents. Even when he has a tantrum; the Dursleys love him anyway.

A Tabby Cat

A tabby cat is a cat with a gray or tawny coat mottled with black. It is sometimes called, simply, a tabby.

A tabby, with markings around its eyes, is sitting on the corner in front of the Dursleys' house when Mr. Dursley leaves the house on Tuesday morning. The tabby is consulting a map and reading the street sign that says Privet Drive. The tabby is still sitting on a wall in front of the Dursley house, at the end of the workday, on Tuesday, when Mr. Dursley returns. When shooed, the tabby doesn't move; instead it gives a stern look to Mr. Dursley. After Mr. Dursley goes into his house, the tabby looks expectedly down Privet Drive "as though it were waiting for someone."

Another particularly desirable implementation of the described technology is to provide an interactive site with the progressive definitions thereon. In that embodiment, distal electronic users may add to or enhance or comment upon the available progressive definitions through the internet. A modified version of this format would be for a regular update of the progressive definitions on-line by central system approval. As definitions collect on the open website, a central administrator will review the suggested changes and decide which if any proposed changes will be accepted. This would protect a base of the progressive definition technology against graffiti, vandalism or other intentional or unintentional damage. The review of the suggestions could be made at any time interval, such as daily, weekly, monthly, or the like. The original patent application U.S. Ser. No. 10/951,313, filed 27 Sep. 2005, from which this application claims priority, addresses several ways to reduce the cost and time for preparation of a Progressive Reference. The new information provides a Progressive Reference that, while not as exact as a Progressive Reference prepared in the ways described in the patent application—and therefore, only valuable when the time and cost require a simpler preparation method—can be prepared semi-automatically and, even, totally automatically.

If the user is reading a Primary work using a computer, a website, or other type of electronic reader, the reader can assemble a Progressive Reference on the fly. This is called a Previous Occurrence.

To prepare a Previous Occurrence (A Progressive Reference on the fly), the reader, with the aid of a computer application, can call up information already in the Primary text to serve as the Source of Information the reader needs. Here is how one embodiment of a Previous Occurrence assembled or prepared by the reader appears to the reader:

The reader touches on, or looks up, the key-word (e.g., selected by the reader) with respect to a specific text. First, the sentence with the last occurrence of the key word in the specific text is instantly displayed. This initial step, of course, can operate similarly to the Edit/FIND function in word processors. The "FIND" function lets a reader find the previous, and next, occurrence of a word in an identified document, but does no more than highlight that term, or (using the Find/Replace function) replace that term with another specific term. It displays the full page with each occurrence of the word highlighted. But, it is a four-step process that requires the user to (1) Be in the document, (2) Call up the find function. (Control-F), (3) Type the key-word in the dialogue box, and (4) hit return. The "FIND" dialogue box stays on the screen, and allows the reader to go to the next occurrence, or previous occurrence of the word.) FIND ordinarily scans the documents and immediately highlights and travels to the first appearance of the word or the next appearance. It also does not have a function of immediately returning to the last appearance.

In the simplest version of a Previous Occurrence (Also referred to herein as a Progressive Reference LITE), only the last sentence in which the word occurred is reproduced. In a preferred version, the sentence along with some previous sentences and some following sentences are reproduced, identified (e.g., page and line number), or accessible in both forward (next, next [number, e.g., 2, 3, 5, etc.], previous or previous [number]). The choice of how many, if any, surrounding sentences are presented may also be accomplished by a user selectable setting, which is simple to program, or it is determined automatically and/or by default, if inexactly, by a program that selects the contiguous sentences that contain nouns and pronouns that suggest the contiguous sentences may deal with the same subject. Additionally, once that previous appearance has been revealed, there could/should be an automatic expansion function, such as the direction arrows allowing for expansion of the view of the text in different directions in the text, forward, backwards or both. Any position within the text may be selected as a reference point or starting point for a term. For example, if it is recalled that a character is introduced at a certain point in the story, or if there is a particular fact about a character that is desired at a generally known portion of the story, that point may be accessed and the search begun centrally from that point in the text.

The Previous Occurrence system next allows the reader to iterate backward as an automated function, if the reader wants more information, by "touching" (e.g., highlighting and engaging the function, right-button clicking, etc.) any word in the reference/citation. The reader can keep touching a word in each subsequent reference, back to the beginning of the book. Keep in mind, when iterating backward, the system remembers where the user started so that each time a key word is queried, even within a Progressive Reference citation, the new reference or citation is allowed to come only from text that has occurred prior to the location of the original key-word before the reader started to iterate the look-up. A "return" icon may be provided during the function to return the cursor and text function back to the original cite where the program was initiated.

A further feature of the Previous Occurrence allows a reader to expand the text of the reference/citation by touching a command that may be provided as an icon or by using existing keyboard buttons (such as the arrows) when the function is engaged.

A further use of artificial intelligence will allow the reader, or a preparer, automatically to assemble a reference combining several previous occurrences of the word with redundancies eliminated.

The print version of a Previous Occurrence contains the last one, two, or more occurrences of a key-word surrounded by selected, relevant text. A web site can easily have all of the functionality described above.

The present technology covers a search engine, different search parameters, and/or different search results and quality depending on the stated characteristics of the user. The term "Search Engine" may also include the traditional term "Web page." The process and technology described may also apply to more immediately observable or readable content on the source or segment, and may be displayed in header format, such as footnotes or endnotes. These would be glossary-type definitions that follow our Progressive Reference rules. That is, they are unique to where the key-word occurs in the text, and not revelatory of information that occurs later in the text, i.e., a "spoiler," to avoid premature revelation.

There are underlying techniques, methods, software and hardware that may be used to implement the technology described herein. Various alternatives and embodiments are described herein which are not intended to limit the scope of the invention, but provide species examples of the generic concepts that are the subject matter of the claimed invention. There is a simplified way of providing progressive references within an electronic text that may be described as follows. As is understood in the art, each appearance of a word or phrase is readily identified within the electronic data or electronic file within which the word appears. The appearance of a word or phrase on a screen is merely the transportation of that data and its location and stimulating pixels on the viewing screen to reflect the position of the word or text within the entire screen display of data. There are existing functions in word processing and text display technologies that allow a user to highlight a word, text or image (hereinafter referred to generically as "displayed text") on a screen so that, at least temporarily, some level of memory is aware of the highlighting of the displayed text and its position within the complete electronic text or file. One aspect of the present progressive reference system is to provide in essence a corresponding look-up table or position-sensitive file such that when the progressive reference function is available (e.g., turned on), highlighting, touching or otherwise specifically identifying a displayed text will call up or pop-up a reference/definition/text/hypertext/link or the like that is position sensitive to the displayed text.

For example, the term "murder victim" may appear one hundred (100) times within a complete text. As each occurrence of the term appears in the complete text, some additional level of information on the "murder victim" may be added in the complete work. For the first five appearances of the term in the complete work, the corresponding reference brought up by activating the term might be A) "a male body, found in the card room of the Washington Downs Card Room, dead of a single stab wound." As the story progresses, and additional information is provided in the story text on the murder victim, the sixth appearance of the displayed term may reference a different portion of the look-up table or reference to position correspondence data to 20 state B) "Daniel Fontainbleu, the tax attorney who was found in the card room of the Washington Downs Card Room, dead of a single stab wound." After three more appearances of the displayed text 'murder victim', the reference brought up by activating the displayed term might be C) "Daniel Fontainbleu, the murdered tax attorney who did work for both the Cardright Corporation and Stefano Napoli, a local bookie." The progressive reference could work by having each position of the displayed text given a relative or specific location indicator in the electronic file or text, such as appearances 1, 2, 3, . . . 100. When displayed text having a position indicator of 1, 2, 3, 4 or 5 is activated under the progressive reference system, the correspondence function of the progressive reference would access only A) from the available possible references. For positions 6, 7, 8 and 9 for the displayed text that is activated under the progressive reference function, only definition or reference text B) would be displayed, either as a pop-up on the screen, bubble text on the screen, in a margin on the screen or as a header or footnote on the screen.

The available progressive references would thus be tied to specific position indicators and possibly even types of usages of the term or word as used within the text over ranges of the complete text. One subfunction in the system might allow users to move backwards through earlier progressive references if additional information is needed, but not to allow forward movement through later reference material that has not yet been disclosed in the text. It might be possible to allow limited or full forward movement by specifically asking for a forward progression through references, if the designer wished to do so.

The cross-reference functionality could be built into the system by providing a series or at least one blank cross-function or cross-reference or look-up table to a preparer producing the progressive reference content for a specific work. This functionality also could be provided to writers during drafting of a book as a tool to assist writers. Not all words in the text would be provided with a progressive reference function, such as common nouns, common verbs, etc., as that would be wasteful. Only terms of some ambiguity or importance would be used in this system. As each instance of the displayed term occurs in the ongoing text, the drafter or writer would perform at least one of the following functions. First, the preparer would write an initial reference and that initial reference would be entered in a cross-functional, look-up table as the progressive reference for the first occurrence of the displayed text. The preparer would then proceed through the continuing text, until at least a next occurrence of the displayed term appears. The preparer would then decide if there had been additional text content that should be included in the next progressive reference, or if the reference to that displayed term should remain the same. If the determination is that the reference to the displayed term should remain the same, the preparer will tie that next occurrence to the original (first) reference definition. The software would therefore provide a link of 1st occurrence and second occurrence of [displayed term]—First reference material. If at the time of the next (in this case the second) occurrence, additional content should be known about that term, a second reference will be added to the reference portion of the file, and that newer (second in this case) reference would be tied to at least the encountered next (second) occurrence of the displayed term.

This procedure of evaluating each next occurrence of the displayed term would be performed by the preparer as the text is moved through. As the reference content is not likely to require changes with each occurrence of the displayed term in the text, only substantial contextual changes would need to be reflected in a displayed term, a single term that appears 100 times in a 400 page text might have cross-reference or progressive reference tables that would look as follows:

| Displayed Term I | |
|---|---|
| Occurrences 1-6 | DEFINITION/REFERENCE #1 |
| Occurrences 7-9 | DEFINITION/REFERENCE #2 |
| Occurrences 10-23 | DEFINITION/REFERENCE #3 |
| Occurrences 24-33 | DEFINITION/REFERENCE #4 |
| Occurrences 34-59 | DEFINITION/REFERENCE #5 |
| Occurrences 60-76 | DEFINITION/REFERENCE #6 |
| Occurrences 77-93 | DEFINITION/REFERENCE #7 |
| Occurrences 94-100 | DEFINITION/REFERENCE #8 |

This would also be a very effective tool for a writer to keep track of the degree of disclosure intended in the text as it progresses. In that way, too little or too much will not be provided for the displayed term. In an existing electronic text, a preparer would highlight or button a specific term, add that term as a specific displayed term for the progressive reference in an available cross-referencing system (i.e., the system that connects references to positions of a displayed term in the text), then the system would automatically or by user input identify the progressing location within the total text and the preparer would create a reference for that specific location. The preparer would progress through the text, and either the preparer would highlight the next and later occurrences himself, or the processor would recognize the presence of an already established display text term or word on the text and highlight it. The preparer would then determine what if any additional information is needed in a progressive reference or that the previous reference is sufficient. The preparer would then add (tie, table enter) the newest position of the displayed text to an existing reference or tie it to a new progressive reference created by the preparer. Another way of characterizing the association of position sensitive text and definitions is for each word to be treated as a key and changing object. This would form a 1-dimensional array accessed according to location in text. X code identifies the reference to the range designation to identify specific locations of an object reference. This enables a position-sensitive key to access different objects in the available array.

Buttons follow the target-action design pattern. A button is a user interface object that sends an action message to a target when clicked. For more information on this design pattern, see "The Target-Action Mechanism" in Cocoa Fundamentals Guide.

Most of the button's work is handled by the NSButtonCell class. An NSButtonCell instance sends its action message to its target once if its view is clicked and it gets the mouse-down event, but can also send the action message continuously as long as the mouse is held down with the cursor inside the button cell. The button cell can show that it's being pressed by highlighting in several ways—for example, a bordered button cell can appear pushed into the screen, or the image or title can change to an alternate form while the button cell is pressed.

Application or creation of the buttons can be effected by coordinating a range for each word, parsing a word, characterizing font size for the word. The system provides touch sensitivity and function in a preferred mode. The software is preferably coordinated in size to the font for the particular text. The buttons are not a truly generic software function, but must be trained for each font style and point to create the invisible button on the text. The system provides buttons for a predetermined list of only specific words. The designer will provide button positioning for progressive reference. Every button is unique and knows what to do, e.g., buttons for the Progressive Reference Button. Buttons contain a range identifier.

A software kit, download, CD, memory device or the like can be provided to writers, editors, and/or preparers to create the progressive reference content while writing or editing or working on the text. As described herein, the kit may be provided to students and teachers for use in study and learning environments.

In the educational venue, additional capabilities are uniquely available and uniquely helpful to instructors, aides and students. There can be an Instructor or Teacher's toolkit. The system may be used with students wherever they are in classrooms or in distance learning courses, or hybrids. At all times, students and teachers can be anywhere reading a single textbook. As each student scrolls through the text, and as students call up specific enhancements such as the Progressive Reference, Previous Occurrence, Context Sensitive Definitions, searches, and so on, and as questions come in from individual students, the teacher can monitor those words or areas in the text that are receiving high volume traffic. Teachers can see where questions are occurring on identical portions of the reading material. Questions can be tracked, not only collectively, but also to individual students allowing teachers to suggest tutoring on weaknesses for specific groups of students or individual students. This data surrounding individual words can be displayed as a heat map, capable of measuring duration of view (dwell time) at specific words or portions of the text, as well as use of enhancements including discussion forums as described in the next paragraph.

At a central location, as traffic content is monitored, a teaching assistant, professor or other preparer may alter progressive references on the fly. The system may also, be used to allow sharing of information and comments among students—receiving and sharing comments and questions by students and teachers-all specific to an exact word, location in the text, idea or event, thus making discussion both pertinent/relevant and manageable (manageable because discussions are centered on a single word will have fewer comments). Lessons for following days, and course instruction may be altered and tailored based on analysis student usage and questions they pose to each other and to the teacher. Students may highlight and drag specific text into a blank balloon representing a question. This can enable the teacher to answer the questions individually, collectively, and/or to provide additional enhancements to the text. The teacher may enhance text with something other than his own thoughts, such as a student insight. Teacher enhancements can include emphasis on, and hints of, ideas that will be on tests. Many enhancements will contain videos, graphics, and other data that are supplied by publishing and content production companies that will pay the operator of the system to have their material be included and credited. Examples are news services like the New York Times, and video production companies like Discover Communications, The History Channel, NOVA, and National Geographic.

The system can collect reader behavior to help authors and others understand how people are reading their material.

The system includes a Preparer's tool, actually a suite of proprietary software tools, designed to allow any preparer to prepare enhancements quickly. In addition to increasing a Preparer's productivity, each tool within the Preparer's suite is designed to help the Preparer create enhancements centered on each key word's location that are more exact, comprehensible, and concise than would be likely without the tool. There are a variety of features that can be used within these Preparer's tools to expedite a Preparer's task such as, by way of non-limiting examples:

(a) A "Text-Screen" displays the text surrounding the keyword, which is usually a single word, but can be a compound word, a phrase, a sentence, or a paragraph. The Preparer highlights the keyword to get started.

(b) The Preparer using the software will place whatever interactive object (shadowed text or word, highlighted text or word, e.g., on a touchscreen). The Preparer's tool will mark what word or phrase is to be enhanced.

(c) A second screen, the "Work-Area Screen" displays the Preparer's work area. This screen, when appropriate, includes hyperlinks to websites like search engines, forums, social networks, photo libraries, dictionaries, and encyclopedias.

(d) A third screen, the "Enhancement Screen," displays the enhancement as it is finalized. The Preparer indicates when he is fully satisfied with his enhancement. At that point, the tool automatically generates the code necessary so that the keyword's button activates the right enhancement. The Preparer can undo the enhancement and edit it, or start again upon command and direction.

(e) The Preparer's Work-Area Screen can show all Previous Occurrences of the key term, and a history of all of its enhancements, including not only the enhancements prepared by this tool and other tools in the Preparer's suite, but also enhancements provided by others, such as by crowd sourcing.

(f) The Preparer's tool, depending on instructions in each type of tool, activates the correct corresponding word, or words, in another screen.

Although there are 30 or more types of enhancements, and a Preparer tool for each one, all of the tools utilize various formatting techniques and underlying software such as, but not limited to those described in (a) through (f) above. In addition, many of the available tools use common software method elements to create the appropriate enhancements and execute new and unobvious processes under the umbrella of this technology. This patent application describes these general software method elements as classes.

There are approximately 8 general classes of Preparation Tools:

(1) The first class of Preparer's tool is used to prepare a place-sensitive gloss, called a "Progressive Reference" enabling understanding of a word at a specific location. The gloss comes exclusively from information supplied previously in the text. Examples include, (a) "The Story So Far," (b) characters, (c) places, (d) ideas and (e) other words defined earlier by the author; (f) Key Concepts, (g) Paragraph Synopses, and (h) Rolling Chapter Synopses. This first tool presents the text in one window, and the keyword's last progressive reference in a Work-Area Screen. The Preparer uses the Work-Area Screen to prepare a new Progressive Reference. He starts with the last Progressive Reference, adds new information, deletes some old information, and edits the result to come up with a new, concise Progressive Reference. This tool also allows the Preparer to indicate that the last Progressive Reference should be repeated for this location when there is no important new information yet in the work for the keyword.

(2) A second class of Preparer's tool is similar to the first, but in addition to the tool being preloaded with the text on which the Preparer is working, it is preloaded with caches of enriching content supplied by the author, editor, and/or publisher. These caches include images (photos, drawings charts, tables, and diagrams), author's footnotes, video clips, audio clips, footnotes, annotations and bibliographies. The Preparer selects what enriching content will be available at specific locations in the text.

(3) A third class of Preparer's tool automatically retrieves information from the text itself. Information of this kind includes page numbers from a print version of the work, a Reverse Index entry, and a Find function.

(4) These first three tools do not provide a way for the Preparer to add content.

(5) A fourth class of Preparer's tool provides the Preparer with, not only the original text, but also a way to bring into the tool appropriate content, like a medical dictionary, thesaurus, or atlas from which the preparer can select text or photos. Examples of enhancements prepared this way include context-sensitive definitions, context-sensitive translations and context-sensitive pronunciations. In these cases, the Preparer has set up sources from which he likes to quote as preferences in the Work-Area Screen so that when he highlights a word in the text, the data appropriate to that word is automatically drawn from his preferred reference sources. In the Work-Area Screen, he selects and edits data from his references for an exact contextual definition, contextual pronunciation, etc. When he has selected text from such a source, a citation crediting the source in a standard form such as APA (American Psychological Association) or MLA (Modern Language Association of America) is automatically included with the enhancement to avoid plagiarism.

(6) A fifth class of Preparer's tool is similar to the fourth, but includes in the Work-Area Screen the first-order results of an external search. In order for the reader's search to be targeted to the exact meaning of the word in context, this tool allows the Preparer to see the result of his search, and narrow it down by amending the search terms, iteratively, until the search is precisely correct for the word in context. When the reader activates the search function, the keyword will always be accompanied by the preparer's added search terms, thus yielding a search most likely to focus on websites relevant to the true meaning of the word in context (at a specific location in the work) and in a frame of reference suggested by the work. The same manually appended search terms can be used to permit a reader to find advertising (such as magazine ads that ran nationally for the 1955 Chevrolet Bel Air Convertible, or the most current ad from Medical World News for Lipitor), websites, applications, games, puzzles, and so on particular to a specific location in the text, and because the information arises from a real-time search by the reader, the information is always up-to-date. This is necessary when the reader is looking for a reference in a search engine, a shopping engine, or an encyclopedia. This class may be amended and updated as needed through internet connection with a central control environment or preparer accessing the system through a password-encoded protection entrance to the system.

(7) A sixth class of Preparer's tools permits readers to enter a forum in which readers can read and post comments and questions specific to their exact location in the work. Posters can choose the granularity of the Progressive Reference Forum so they can read and write a comment that will be found only at a specific word, phrase, sentence, or paragraph. Similarly, readers can make such granularity adjustments to adjust the specificity and sensitivity of the posts they are reading. The tool allows a poster to simultaneously or asynchronously read and respond to other relevant posts. The forum can take place on a web page dedicated to a single work, or class of works. The forum can be hosted on Facebook, a dedicated forum, or be organized as Twitter Feeds. Specific subsets of this class of preparer tool are designed for peer review and for editing where comments have to be tracked and confirmed.

(8) A seventh class of Preparer's tools is similar to the last class in that it is designed to organize the comments of specific contributors like teachers, students, expert annotators, etc. This tool has graphical elements that make it easy to see who is posting, and who is reading, and to thread their comments, or to thread types of comments such as likely quiz questions.

(9) Preparer's tools can link, by location in the work, to "heat maps" for specific words giving authors, teachers, annotators, editors, and others up-to-date information on reader's choices of enhancement(s), forum activity, and enhancement and forum dwell time for each location in the text. It is believed that the described network will be able to handle large forums around individual words, and to track and report on them.

(10) An eighth class of Preparer's tools is specific to the preparation of a "Smart Previous Occurrence." This tool makes it easy for a Preparer to quickly find previous occurrences that are synonyms of the keyword. (A variant on this tool allows a Smart Global Find-a word is found, including synonyms of the word, throughout the text.) In the Work-Area Screen, a reveal of the previous text is displayed as the preparer moves his cursor back. As a time-saver, the revealed text has all of the nouns highlighted. (A supporting, dictionary-based engine identifies all nouns and gerunds.) Once the Preparer highlights the full synonym, at the Preparer's option, the synonym may automatically be entered into a table that is used by the if/then algorithm that substitutes Smart Previous Occurrences. The code is not all that dissimilar to "search for" functions provided in Word Processing software, adding a "backwards vector" functionality to the search. This means "search for the user selected word," but only up to that word's previous position. A Smart Previous Occurrence is a novel format of a Progressive Reference. The Preparer flags the Progressive Reference so that the reader software knows that the Progressive Reference is to be substituted for the automatically generated Previous Occurrence. Instead of the reader application entering the Previous Occurrence search process described above, it displays the Progressive Reference (the Smart Previous Occurrence in this case) instead.

(11) All Preparer tools may allow the preparer to create "nested enhancements." A nested enhancement provides a tool's enhancement function within an enhancement. A Preparer could continue through many levels depending on a cost/benefit analysis. The argument for nesting is that a Progressive Reference may include words that a reader would like help with. The tension is that permutations at ever decreasing levels can be cost-prohibitive. It will be helpful that often an enhancement can be reused.

(12) Any text can be linked to Preparer-defined metadata whether that be more text, media, or any digital pointer to more information.

There are a number of general types of tools that may be provided within the total system or variations of the system.

1) The Reader Tool. This is the interface between the reader and the system, and may use any language or I/O interface that can control positioning of the focus or highlighting of the target terms.

2) The Tracker Tool. This is the tool that tells authors, teachers and others what readers are doing and tracks where the readers are.

3) A server-based Forum. This may work as a server-based forum, and optionally have versions that work as do Facebook and Twitter or other social networking applications or forums. The forum-based system is novel because it is linked to individual words and phrases rather than books.

4) A custom data structure that allows an efficient way to store and access all the work's keywords and enhancements in all appropriate memories including hard, random, and network. Such a custom data structure is more efficient than using human-readable XML code. Thus, all Progressive Reference data should be storable and accessible without running out of memory.

5) Internet-based communications applications that allow the reader to communicate with the Forum. This may be included in the Reader tool.

6) Internet-based communications applications that allow the Tracker to talk to the Forum. This may, for example, also be included in the Tracker Tool, or in the reader with support from system databases. The reader would track what users do and send that information to a central database for monitoring and reporting purposes.

7) A reading/selection/display algorithm would be optimized to deal with potentially very large data sets. Each word in the text could be a Key to multiple enhancement entries, especially to have the enhancements be not only context-specific, but also user-specific. This would be done so each word that the user can touch upon can conceivably return a large number of different data entries. It is likely that statistical analysis software would be coupled with visualization software to create the 'Heat Maps.'

Annotation with Variable Granularity

A user setting, by default or as an option, which allows the user to go to a forum that categorizes discussions based on where that the user is in a text. (A forum is a dedicated forum, or a Facebook™ page or Twitter Feed.)

Progressive References, Contextual Definitions, Previous Occurrences, and other enhancements are brought up by the reader touching on a keyword. However, some enhancements can be logically related to two or more words. Examples are annotations, footnotes, synopses, phrase origins and forums. When a reader wishes to key off a sentence, a group of sentences, or a paragraph, rather than a single word, that option is available. Reader determined granularity can solve the problem of generating too few or too many comments or comments that are too narrow or too broad. When a reader highlights the group of words he wants to make his "keyword," the enlarged highlighting tells the system what forum to go to. If different readers ask for a forum on sentences that overlap, the system takes the sum of both users' requests to arrive at a group of contiguous words.

Grouped Enhancements

An easy and efficient way for a reader to quickly catch up in a word is to enable the reader to see a group of all enhancements in a block of text such as a paragraph.

Although the practice of the present technology can operate on many different apparatus formats, especially any comprising a processor configured to operate the process, software and functions described herein, and a viewing screen that is responsive to reader input (e.g., by cursor/mouse activation, touch-screen operation, voice activation and the like), the operation of the combinations of technology creates a unique system.

It must also be remembered that a display screen used in the system is essentially devoid of any organized distribution of light and dark patterns in the absence of direction by the software driving the processor and user input. Operation of the system locally stimulates local screen functionality (electron-beam stimulation, liquid crystal systems, light-emitting diodes, plasma screens and the like are transformed in their light-emitting distribution and display with not only primary text to be read, but also the secondary content provided by Progressive References, Previous Occurrences, other enhancements, and the creation and operation of the other tools described herein.

1. Streaming video snippets. Touch on any word in the text, and the system will still recognize a position in the text. When there is a video or movie counterpart of the text (or even multiple versions may be accessed, such as the 1940 movie version of Jane Austen's *Pride and Prejudice*, the 1985, or 1995 BBC TV production of *Pride and Prejudice* or even the "Bollywood" production of *Bride and Prejudice* may be called up in that precise point in the movie. That scene may be played for as long as you like.

2. Examples. This enhancement provides an alternative contextually correct examples of the term or idea.

In preparing these alternative connect routes or enhancements, they tell the reader software what word/phrase to enhance and what type of enhancement they are, e.g., a video, sound clip, definition, substitution, etc. Logically, the reader software would load the enhancement file, and when it reached a substitution-type enhancement, it would display the substitution instead of the original text. There are basically three types of enhancements or connections that may be made through the present system: A simple text enhancement; a networked enhancement; and a multimedia enhancement.

Scholastic Environment—Forum Instruction

Forums allow a reader to exchange comments with other readers. Because these forums are centered on specific words or phrases, there can be a relatively small number of interesting comments rather than hundreds of comments that mayor may not be relevant to where a reader is in the text.

Teachers and students can use forums to enhance computer and eBook-based assignments. Teachers will be able to track students' learning and tailor future lessons based upon individual student's performance. Students will have access to textbook forums with supplemental exercises, answers to existing questions, and commentary from noted experts in the specific field. Students will be able to add their own notes to a text, and share these notes with the teacher and fellow students. Teachers will be able to share their course notes and assignments with other teachers at other institutions, thus creating a pool of resources for different courses.

Another aspect of the present technology will be discussed under an operating name, for which trademarks may be sought as "Magic Reader" ™ electronic reader system. A system that allows for metadata to be applied to any electronic document after it's been created/distributed without the need to modify the original source text. These documents include but are not limited to ePUBs, PDFs, .docs, .ppts, .rtfs, and .txts. Magic Reader™ system changes a document from a closed, static means of expression into a portal of user-generated and automated context-sensitive information.

Magic Reader™ system effectively turns any electronic text into an updatable/patchable data object that allows for full manipulation said text. Text/media can be added, deleted, or marked up in many ways.

Examples

Embed context-sensitive word-triggered video tutorials in manuals

Make character names "clickable" to show pictures, bios, progressive references, video clips, etc., once clicked Append new data to scientific documents Apply corrections directly to older newspaper and magazine articles Allow textbook publisher to remove Pluto from list of planets in old text books Allow a teacher to enhance an eVersion of Jane Austen's *Pride and Prejudice* with adaptive learning quizzes, idiom glossaries, timelines, etc. The teacher will receive the students' behavioral analytics This system can benefit the reader in many different milieu:

A sports fan, when reading an article on the nytimes.com, a user can touch on the phrase 'Uribe's home-run' to cause a pop-up video of the home-run from the night before.

A student, when reading Jane Austen's *Pride and Prejudice*, can click on an idiomatic phrase to see his teacher's contextual definition of that phrase.

A scientist, when reading a two-year old scientific journal article, can click on a word or graph to see an updated data set.

A doctor, when reading a journal article, can click on a term that was used earlier in the document to refresh his memory of what the author has already explained.

This system is significantly different from what is commercially available at the present time. Currently, there is no way for anyone to create enhancements for documents. Companies like Apture and Hyperword provide automated semi-contextual, pop-up searches but do not allow for the creation of authors' enhancements or contextually precise enhancements, as Magic Reader™ system does. In this way, Magic Reader™ system is a game-changer.

The Magic Reader™ system can be seen as an enabling system wherein an enhancement author creates an enhancement file following the Magic Reader spec. This spec is similar to HTML, XML, etc. and hopefully will become the de facto standard like PDF. The author can use the online editor or the standalone Magic Reader™ system Creator Suite™ supplement. Online enhancements are stored on, for example, magicreader.com's servers and can be shared or private. Once Magic Reader™ system has access to the enhancement file, it applies the enhancements to the source text on the fly.

Use Cases

Scenario 1 (Offline):

A publishing house licenses Magic Reader™ system Creator Suite™ supplement. The Creator Suite is a standalone app that will mostly be used offline, but could potentially contain features that require an internet connection.

An employee at the publishing house begins creating enhancements, and once satisfied, saves the document as "Harry_Potter_and_the_Deathly_Hallows.mre". (In this case the file extension "mre" is being used, but no actual extension name has been decided on).

The publishing house then uploads the .mre file to all the eBook stores that sell "Harry Potter and the Deathly Hallows".

A reader who already owns "Harry Potter and the Deathly Hallows" purchases the enhancement for 99 cents.

The reader launches Magic Reader™ system, and Magic Reader™ system applies the enhancements directly onto the screen, preferably by touchscreen functionality.

Scenario 2 (Online):

A teacher logs on to magicreader.com and uploads some notes in the form of a Word Document.

Our Magic Reader™ system server converts the text out of the document and saves it as an .mgc file. Again, the actual file extension has not been decided upon, but this file will be used to preserve the original document's formatting and at the same time make it easy for us to apply enhancements.

The server generates a document ID (123abc) and stores it in the database.

The teacher navigates to the online version of the Magic Reader™ system Creator Suite™ enhancement. This online version mayor may not support some of the advanced features the standalone version supports.

The teacher loads document 123abc (a .mgc file) and begins making enhancements.

When the teacher is satisfied with the enhancements, the enhancement is saved and named.

The server generates an enhancement ID (987xyz), associates it with document 123abc, and stores the enhancement file on the drive as 987xyz.mre.

The teacher allows this document and its enhancement to be viewed and modified by his students. The enhancement may be renamed as a collective ID or as individual documents from each student with their own names or codes associated with the new ID.

A student logs onto magicreader.com and notices a new document is available to view.

The student selects the document, and the server loads the file, looks up the associated enhancement file, applies the enhancement in the form of HTML tags, and finally presents the enhanced document to the student.

Scenario 3 (Online+Offline):

A Harry Potter fan creates his own enhancement file, and uploads it to magicreader.com.

Another Harry Potter fan launches Magic Reader™ system and searches for Harry Potter enhancements.

The second fan finds the one and downloads and loads the file. He reads for a bit.

The next day, he decides to read while on the subway to work. Magic Reader™ system knows this particular enhancement is a community enhancement and checks for updates, but this process fails since the reader does not have a working connection. The reader continues reading with an older version of the enhancement file.

After work, he launches Magic Reader™ system from home. This time, Magic Reader™ system is able to connect to the internet and update the existing .mre file that exists on the device.

It is important to note that the present system, unlike available technology such as that used by Wikepedia.com, allows the user to modify, enhance, expand and interact with text on his own processing/reading system and does not have to access the source server itself and modify the text or access other text through the other server.

We claim:

1. A method of operating a reading device having a viewer screen, a processor, and a memory, for accessing information relevant to an electronic text, comprising:

storing, in the memory, the electronic text and a reference system having a plurality of data entries for selected words or terms in the electronic text, each one of the selected words or terms has its own location located in the electronic text, and each one of the selected words or terms is associated with a data entry in the reference system, wherein the data entry is defined corresponding to the location of the selected word or term in the electronic text;

responsive to an identification of a selected word or term in the electronic text on the viewer screen of the reading device, accessing by the processor a corresponding data entry for just the location of the identified selected word or term located in the electronic text but not accessing data entries for the same selected word or term at one or more other locations in the electronic text, through an association between the identified selected word or term at the location in the electronic text and the data entry in the reference system for the identified selected word or term; and displaying on the viewer screen the data entry for the identified selected word or term;

whereby information relevant to the electronic text is accessed.

2. The method of claim 1 wherein the step of storing in the memory further comprises storing the reference system in an electronic look-up file.

3. The method of claim 2 wherein step of storing in the memory further comprises providing an index for the look-up file, the index corresponding to selected words or terms in the electronic text according to a specific locations in the electronic text.

4. The method of claim 3 wherein the step of storing in the memory further comprises:

storing the electronic text in a first file;

storing the plurality of data entries on selected words or terms in the electronic text in a second file separate from the first file;

wherein the step of accessing a data entry comprises:

responsive to the identification of a particular selected word or phrase in the electronic text, directing the processor to cross-reference the plurality of data entries on the selected words or terms in the electronic text and to display a data entry corresponding to the location of the identified selected word or term in the electronic text.

5. The method of claim 2 wherein the step of storing in the memory further comprises providing an index for the look-up file, the index corresponding to selected words or terms in the electronic text according to a range of locations in the electronic text.

6. The method of claim 5 wherein the step of storing in the memory further comprises:

storing the electronic text in a first file;

storing the plurality of data entries on selected words or terms in the electronic text in a second file separate from the first file;

wherein the step of accessing a data entry comprises:

responsive to the identification of a particular selected word or phrase in the electronic text, directing the processor to cross-reference the plurality of data entries on selected words or terms in the electronic text and to display a data entry corresponding to the location of the identified selected word or term in the electronic text.

7. The method of claim 2 wherein the step of storing in the memory further comprises providing an index for the look-up file, the index corresponding to selected words or terms in the electronic text according to ranges of locations in the electronic text.

8. The method of claim 7 wherein at least some of the ranges of locations within the electronic text include more than three distinct locations of the selected words or terms in the electronic text.

9. The method of claim 8 wherein the step of storing in the memory further comprises:

storing the electronic text in a first file;

storing the plurality of data entries on selected words or terms in the electronic text in a second file separate from the first file;

wherein the step of accessing a data entry comprises:
responsive to the identification of a particular selected word or phrase in the electronic text, directing the processor to cross-reference the plurality of data entries on selected words or terms in the electronic text and to display a data entry corresponding to the location of the identified selected word or term in the electronic text.

10. The method of claim 7 wherein the step of storing in the memory further comprises:
storing the electronic text in a first file;
storing the plurality of data entries on selected words or terms in the electronic text in a second file separate from the first file;
wherein the step of accessing a data entry comprises:
responsive to the identification of a particular selected word or phrase in the electronic text, directing the processor to cross-reference the plurality of data entries on selected words or terms in the electronic text and to display a data entry corresponding to the location of the identified selected word or term in the electronic text.

11. The method of claim 2 wherein step of storing in the memory further comprises:
storing the electronic text in a first file;
storing the plurality of data entries on selected words or terms in the electronic text in a second file separate from the first file;
wherein the step of accessing a data entry comprises:
responsive to the identification of a particular selected word or phrase in the electronic text, directing the processor to cross-reference the plurality of data entries on the selected words or terms in the electronic text and to display a data entry corresponding to the location of the identified selected word or term in the electronic text.

12. The method of claim 1 wherein the step of storing in the memory further comprises:
storing the electronic text in a first file;
storing the plurality of data entries on selected words or terms in the electronic text in a second file separate from the first file; and
wherein the step of accessing a data entry comprises:
responsive to the identification of a particular selected word or phrase in the electronic text, directing the processor to cross-reference the plurality of data entries on the selected words or terms in the electronic text and to display a data entry corresponding to the location of the identified selected word or term in the electronic text.

13. A reading device for displaying an electronic text and for accessing information relevant to the electronic text, comprising:
a viewer screen;
a processor coupled to a memory, the memory storing the electronic text and a reference system containing a plurality of data entries for selected words or terms in the electronic text, each selected word or term has its own location located in the electronic text, and each one of the selected words or terms is associated with a data entry in the reference system, wherein the data entry is defined corresponding to the location of the selected word or term in the electronic text;
wherein the processor is programmed to access information relevant to the electronic text by:
upon identification of a selected word or term in the electronic text on the viewer screen of the reading device, accessing a corresponding data entry for just the location of the identified selected word or term located in the electronic text but not accessing data entries for the same selected word or term at one or more other locations in the electronic text, through an association between the identified selected word or term at the location located in the electronic text and the corresponding data entry in the reference system for the identified selected word or term; and
causing the data entry for the identified selected word or term associated with the activated button to be displayed on the viewer screen.

14. The reading device of claim 13 wherein the memory stores the reference system in an electronic look-up file.

15. The reading device of claim 14 wherein the memory stores the reference system with an index for the look-up file, the index corresponding to selected words or terms in the electronic text according to specific locations in the electronic text.

16. The reading device of claim 15 wherein the memory stores the electronic text in a first file and stores the plurality of data entries on selected words or terms in the electronic text in a second file separate from the first file; and wherein in the step of accessing a data entry, the processor cross-references the plurality of data entries on the selected words or terms in the electronic text and displays on the viewer screen a data entry corresponding to the location of the identified selected word or term in the electronic text.

17. The reading device of claim 14 wherein the memory stores the reference system with an index for the look-up file, the index corresponding to selected words or terms in the electronic text according to a range of locations in the electronic text.

18. The reading device of claim 14 wherein the memory stores the reference system with an index for the look-up file, the index corresponding to selected words or terms in the electronic text according to ranges of locations in the electronic text.

19. The reading device of claim 18 wherein at least some of the ranges of locations within the electronic text include more than three distinct locations of the selected words or terms in the electronic text.

20. The reading device of claim 14 wherein the memory stores the electronic text in a first file and stores the plurality of data entries on selected words or terms in the electronic text in a second file separate from the first file; and wherein in the step of accessing a data entry, the processor cross-references the plurality of data entries on the selected words or terms in the electronic text and displays on the viewer screen a data entry corresponding to the location of the identified selected word or term in the electronic text.

21. The reading device of claim 13 wherein the memory stores the electronic text in a first file and stores the plurality of data entries on selected words or terms in the electronic text in a second file separate from the first file; and wherein in the step of accessing a data entry, the processor cross-references the plurality of data entries on the selected words or terms in the electronic text and displays on the viewer screen a data entry corresponding to the location of the identified selected word or term in the electronic text.

\* \* \* \* \*